(12) United States Patent
Kawata et al.

(10) Patent No.: US 7,883,563 B2
(45) Date of Patent: Feb. 8, 2011

(54) HONEYCOMB STRUCTURE AND MANUFACTURING METHOD THEREOF, AND AIR CLEANER AND WATER PURIFIER CONTAINING THE HONEYCOMB STRUCTURE

(75) Inventors: Tomohisa Kawata, Nara (JP); Mikihiro Yamanaka, Soraku-gun (JP); Jun Kudo, Nara (JP); Hajime Tamon, Kyoto (JP); Shin Mukai, Sapporo (JP)

(73) Assignees: Sharp Kabushiki Kaisha, Osaka (JP); Kyoto University, Kyoto (JP)

( * ) Notice: Subject to any disclaimer, the term of this patent is extended or adjusted under 35 U.S.C. 154(b) by 758 days.

(21) Appl. No.: 11/589,982

(22) Filed: Oct. 31, 2006

(65) Prior Publication Data
US 2007/0245702 A1  Oct. 25, 2007

(30) Foreign Application Priority Data
Apr. 25, 2006 (JP) .............................. 2006-120787
Apr. 25, 2006 (JP) .............................. 2006-120788

(51) Int. Cl.
*B01D 39/06* (2006.01)
*B01D 24/00* (2006.01)
*B01D 50/00* (2006.01)
*F01N 3/00* (2006.01)
*F01N 3/10* (2006.01)
*F01N 3/08* (2006.01)
*B01J 23/00* (2006.01)

(52) U.S. Cl. .............................. 55/523; 55/522; 55/524; 422/172; 422/173; 422/174; 422/175; 422/176; 422/177; 422/178; 422/179; 422/180; 60/297; 502/303

(58) Field of Classification Search ........... 55/522–524; 502/303; 422/172–180; 60/297
See application file for complete search history.

(56) References Cited
U.S. PATENT DOCUMENTS 3,658,724 A  4/1972 Stiles
3,816,572 A * 6/1974 Roelofs ....................... 264/28

(Continued)

FOREIGN PATENT DOCUMENTS

JP  1-275438 A  11/1989

(Continued)

OTHER PUBLICATIONS

KR Notice of Grounds of Rejection and English Translation thereof mailed Apr. 15, 2008 in corresponding KR application 120787/2006.

(Continued)

*Primary Examiner*—Walter D Griffin
*Assistant Examiner*—Amber Orlando
(74) *Attorney, Agent, or Firm*—Nixon & Vanderhye P.C.

(57) ABSTRACT

A composite honeycomb structure in which the honeycomb structure is highly functionalized and adapted to have catalytic function, considering pressure loss is provided. A honeycomb structure having average pore diameter of 5 to 200 µm and specific surface area of 100 to 1500 m$^2$/g is provided. Further, a translucent honeycomb structure and a photocatalyst-carrying translucent honeycomb structure having a photocatalyst carried on a surface of the translucent honeycomb structure and/or contained in the translucent honeycomb structure are provided. Further, an air cleaner and a water purifier using the honeycomb structure and the photocatalyst-carrying translucent honeycomb structure are provided.

11 Claims, 3 Drawing Sheets

U.S. PATENT DOCUMENTS

| | | | |
|---|---|---|---|
| 3,885,005 A * | 5/1975 | Downing et al. ............... 264/28 |
| 3,922,412 A * | 11/1975 | Yoshikawa et al. .......... 428/118 |
| 4,280,926 A * | 7/1981 | Abe et al. .................... 502/159 |
| 4,399,052 A * | 8/1983 | Sugino ........................ 502/402 |
| 4,636,485 A | 1/1987 | Van der Smissen |
| 4,749,671 A * | 6/1988 | Saito et al. .................... 502/64 |
| 4,943,542 A * | 7/1990 | Hayashi et al. ............... 501/12 |
| 4,954,327 A | 9/1990 | Blount |
| 5,462,693 A | 10/1995 | Ichimura et al. |
| 5,884,473 A * | 3/1999 | Noda et al. .................... 60/274 |
| 6,227,383 B1 * | 5/2001 | De Ruiter et al. ........... 210/504 |
| 6,365,259 B1 * | 4/2002 | Brundage et al. ........... 428/116 |
| 6,531,100 B1 * | 3/2003 | Ogata et al. ................. 422/177 |
| 6,548,142 B1 * | 4/2003 | Kar et al. .................... 428/116 |
| 6,584,979 B2 | 7/2003 | Xue et al. |
| 6,620,385 B2 * | 9/2003 | Fujii ........................ 422/186.3 |
| 6,632,771 B1 * | 10/2003 | Maekawa et al. ........... 502/239 |
| 6,638,339 B2 | 10/2003 | Dallas et al. |
| 6,669,751 B1 * | 12/2003 | Ohno et al. .................... 55/523 |
| 6,699,561 B2 * | 3/2004 | Wolff ......................... 428/116 |
| 6,907,885 B2 | 6/2005 | Xue et al. |
| 7,008,465 B2 | 3/2006 | Graham et al. |
| 2004/0067175 A1 * | 4/2004 | Heidenreich et al. ........ 422/177 |
| 2005/0239645 A1 | 10/2005 | Schuth et al. |
| 2006/0021310 A1 * | 2/2006 | Ohno et al. .................... 55/523 |
| 2007/0249493 A1 | 10/2007 | Kawata et al. |
| 2009/0025776 A1 * | 1/2009 | Varaprasad ................. 136/243 |
| 2009/0145855 A1 * | 6/2009 | Day et al. .................... 210/748 |

FOREIGN PATENT DOCUMENTS

| | | |
|---|---|---|
| JP | 3-137012 A | 6/1991 |
| JP | 9-47495 A | 2/1997 |
| JP | 9-206558 A | 8/1997 |
| JP | 10-180044 A | 7/1998 |
| JP | 2001-269586 | 10/2001 |
| JP | 2004-130157 A | 4/2004 |
| JP | 2004-293985 A | 10/2004 |
| JP | 2004-307294 | 11/2004 |
| JP | 2005-224703 A | 8/2005 |
| JP | 2006-17425 A | 1/2006 |

OTHER PUBLICATIONS

KR Notice of Grounds of Rejection and English Translation thereof mailed Apr. 15, 2008 in corresponding KR application 120788/2006.

JP Notice of Grounds of Rejection and English Translation thereof mailed Apr. 15, 2008 in corresponding JP application 120787/2006.

JP Notice of Grounds of Rejection and English Translation thereof mailed Apr. 15, 2008 in corresponding JP application 120788/2006.

* cited by examiner

HONEYCOMB STRUCTURE AND MANUFACTURING METHOD THEREOF, AND AIR CLEANER AND WATER PURIFIER CONTAINING THE HONEYCOMB STRUCTURE

This nonprovisional application is based on Japanese Patent Applications Nos. 2006-120787 and 2006-120788, both filed with the Japan Patent Office on Apr. 25, 2006, the entire contents of which are hereby incorporated by reference.

BACKGROUND OF THE INVENTION

1. Field of the Invention

The present invention relates to a honeycomb structure and a composite honeycomb structure that are widely used as catalyst carrier, manufacturing method thereof, as well as to an air cleaner and a water purifier using the same. The present invention also relates to a translucent honeycomb structure and a technique of removing and decomposing harmful substance using the translucent honeycomb structure.

2. Description of the Background Art

A porous material has numerous small pores and, therefore, the porous material has very large inner surface area relative to the outer surface. Therefore, the porous material has been widely used as an adsorbent, a catalyst or catalyst support, a chromatography column, or a filter for an air conditioner or a water purifier. Such a porous material may be used in various shapes fit for the intended applications, including powder, particles, fiber, honeycomb, thin film and nano tube.

When the porous material is used as a filter for an air cleaner, the most popular porous material is activated carbon. When the activated carbon in the shape of particles is used, the activated carbon particles are filled in a container and the fluid is passed therethrough, so that the fluid is processed. The method of fluid processing, however, is disadvantageous as the pressure loss is large and the linear velocity cannot be increased, though the contact area is very large.

In order to reduce the pressure loss, a porous material having a honeycomb structure with a straight flow path is used. Most of the porous materials having the honeycomb structure currently in use are fabricated by extrusion of ceramics. Generally, when cell density (number of cells per 1 square inch) becomes higher and the thickness of honeycomb wall (wall separating pores) becomes thinner, the contact area with the fluid to be processed increases and, as a result, performance is improved. Further, according to a manufacturing method disclosed in Japanese Patent Laying-Open No. 2004-307294, it is possible to fabricate a honeycomb structure of silica wet gel having pore diameter (channel) controlled in the range of 5 to 50 μm and having large specific surface area of 800 to 900 m$^2$/g.

The honeycomb structure obtained by this method allows separating operation and adsorption because of its fine pore diameter. The honeycomb structure, however, is not surface-modified by a catalyst or the like in the form of metal fine particles, for detoxifying a harmful substance. Further, as the pore diameter of the honeycomb structure is as small as 5 to 50 μm, the problem of pressures loss described above cannot fully be solved.

Further, conventionally, a technique of decomposing a harmful substance utilizing photocatalytic effect generated when a photocatalyst represented by titanium oxide is irradiated with light has been known. The technique is applied to a filter of an air cleaner and the like. Titanium oxide particularly has high catalytic function as regards decomposition of harmful substance. Crystalline titanium oxide, however, has small specific surface area, and its surface activity is low. Therefore, in most cases, titanium oxide in the form of fine powder is used. Titanium oxide fine powder, however, is hard to handle, and therefore, it is used carried by a carrier such as silica gel. Use of a carrier in the form of a honeycomb structure or a sheet has been preferred. As described above, most of the honeycomb structures widely used at present are fabricated by extrusion of ceramics.

The method of irradiating the photocatalyst with light differs dependent on whether the photocatalyst carrier has the honeycomb structure or the sheet shape. By way of example, when the photocatalyst is carried by a honeycomb structure, it follows that the light is directed parallel to the pore diameter of the honeycomb structure, resulting in a fatal disadvantage that only a limited part of the photocatalyst can be activated. When the photocatalyst is carried by a sheet type carrier, the amount of photocatalyst to be activated cannot be increased unless the area of irradiation is widened, which leads to a disadvantage that the apparatus becomes large. Further, when the sheet type carrier is used, the amount of harmful substance that can be processed at one time is limited by the photocatalyst at the outermost surface carried by the sheet, and therefore, the sheet type carrier also has a problem in processing capability.

In order to solve the above-described problems, Japanese Patent Laying-Open No. 2001-269586 proposes fabrication of a translucent honeycomb structure by extrusion, using fine particles of 0.5 to 40 μm of quartz glass, alumina, YAG and yttria as raw materials.

What is provided by this technique is a honeycomb structure formed by extrusion, in which the pore diameter size and honeycomb wall thickness are both controlled in the order of mm. Specifically, the honeycomb structure comes to have smaller surface area per unit volume or unit weight, and hence, it becomes difficult to cause efficient reaction between the fluid containing the harmful substance and the photocatalyst fine particles. The photocatalytic effect of photocatalyst represented by titanium oxide comes from the reaction at the outermost surface of photocatalytic particles, and therefore, it is apparent that the larger the amount of catalyst carried per unit weight or volume of the carrier, the higher the effect.

Further, there may be applications other than the example of air cleaner described above. By way of example, when a translucent honeycomb structure carrying photocatalyst is used for purifying water such as daily life water, it becomes possible to decompose and remove harmful substance contained in the fluid by filtering with irradiation of external light beam, such as ultraviolet ray.

SUMMARY OF THE INVENTION

An object of the present invention is to provide a composite honeycomb structure in which the honeycomb structure is highly functionalized and adapted to have catalytic function, and has average pore diameter of 5 to 200 μm considering pressure loss, and to provide the manufacturing method thereof.

A further object is to provide a translucent honeycomb structure having pore diameter effective to remove harmful substance, a photocatalyst-carrying translucent honeycomb structure fabricated by adapting the translucent honeycomb structure to carry the photocatalyst, and to provide the manufacturing method thereof.

A still further object is to provide an air cleaner and a water purifier containing the composite honeycomb structure or the photocatalyst-carrying translucent honeycomb structure described above.

The present invention is directed to a honeycomb structure having average pore diameter of 5 to 200 μm and specific surface area of 100 to 1500 m²/g.

Preferably, the honeycomb structure in accordance with the present invention is porous.

Further, the present invention is directed to a composite honeycomb structure in which metal fine particles are carried on a surface of the honeycomb structure and/or the metal fine particles are contained in the honeycomb structure.

Preferably, in the composite honeycomb structure of the present invention, noble metal is used as the metal fine particles.

Further, preferably, in the composite honeycomb structure of the present invention, platinum and/or silver is used as the metal fine particles.

Further, the present invention is directed to a method of manufacturing a honeycomb structure having average pore diameter of 5 to 200 μm and specific surface area of 100 to 1500 m²/g, including the following steps:

(a) preparing silica sol by mixing ion exchange resin in sodium silicate aqueous solution;

(b) removing the ion exchange resin and adjusting pH;

(c) gelating the silica sol to provide silica wet gel;

(d) freezing the silica wet gel;

(e) thawing the frozen silica wet gel; and (f) after thawing, drying to provide silica gel.

Further, the present invention is directed to the method of manufacturing the composite honeycomb structure including, in addition to the method of manufacturing the honeycomb structure described above, the following steps of (g) introducing metal fine particles to be carried on a surface of the silica wet gel or the silica gel and/or (h) dispersing metal fine particles in the silica sol.

Preferably, the method of manufacturing the composite honeycomb structure in accordance with the present invention includes, after drying, the step of introducing the metal fine particles to be carried on the surface.

Preferably, the method of manufacturing the composite honeycomb structure in accordance with the present invention includes, before drying, the step of introducing the metal fine particles to be carried on the surface.

Further, preferably, the method of manufacturing the composite honeycomb structure in accordance with the present invention includes, after the step of removing the ion exchange resin and adjusting pH, the step of dispersing metal fine particles in the silica sol.

Preferably, in the method of manufacturing the composite honeycomb structure, noble metal is used as the metal fine particles.

Preferably, in the method of manufacturing the composite honeycomb structure, platinum and/or silver is used as the metal fine particles.

Further, the present invention is directed to an air cleaner in which the composite honeycomb structure is used as a filter.

Further, the present invention is directed to a water purifier in which the composite honeycomb structure is used as a water purifying filter.

Further, the present invention is directed to a translucent honeycomb structure having average pore diameter of 5 to 200 μm and specific surface area of 100 to 1500 m²/g.

Further, the present invention is directed to a photocatalyst-carrying translucent honeycomb structure, in which the photocatalyst is carried on a surface of the translucent honeycomb structure.

Further, the present invention is directed to a method of manufacturing the translucent honeycomb structure including, in addition to the steps (a) to (h) of the method of manufacturing a honeycomb structure described above, the following steps of:

(i) performing primary firing of the honeycomb structure formed by silica gel or silica wet gel at 200 to 1000° C.; and (j) after the primary firing, quenching and thereafter performing secondary firing at 1200 to 2000° C.

Further, in the method of manufacturing the translucent honeycomb structure of the present invention, preferably, the first firing and the second firing are performed in any of noble gas atmosphere, reducing atmosphere, oxidizing atmosphere, vacuum, and superheated steam atmosphere.

Further, the present invention is directed to an air cleaner in which the photocatalyst-carrying translucent honeycomb structure is used as a filter.

Further, the present invention is directed to a water purifier in which the photocatalyst-carrying translucent honeycomb structure is used as a water purifying filter.

In the composite honeycomb structure obtained by the present invention, metal fine particles of noble metal are dispersed in and/or carried by the composite honeycomb structure as a whole. Therefore, the composite honeycomb structure may effectively be used as a filter material carrying a catalyst that causes an oxidizing reaction for detoxifying harmful substance. Further, the honeycomb structure in accordance with the present invention has average pore diameter of 5 to 200 μm, and therefore, pressure loss can be made smaller than the conventional, prior art honeycomb structure having the pore diameter of 5 to 50 μm.

According to the present invention, a honeycomb structure having average pore diameter of 5 to 200 μm and specific surface area of 100 to 1500 m²/g is fired to form a translucent honeycomb structure, whereby a carrier that effectively exhibits the capability of removing harmful substance intrinsic in the photocatalyst can be provided. As the translucent honeycomb structure carries the photocatalyst, a photocatalyst-carrying translucent honeycomb structure that effectively exhibits the capability of removing harmful substance intrinsic in the photocatalyst can be provided. Further, by combining the photocatalyst-carrying translucent honeycomb structure and a light source of ultraviolet ray or the like for air cleaning or water purification, harmful substance can be removed. By providing a device/product based on the air/water purifying technique, it becomes possible to provide a life space safer and friendlier to humans and to the nature.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Honeycomb Structure

Figure 1:
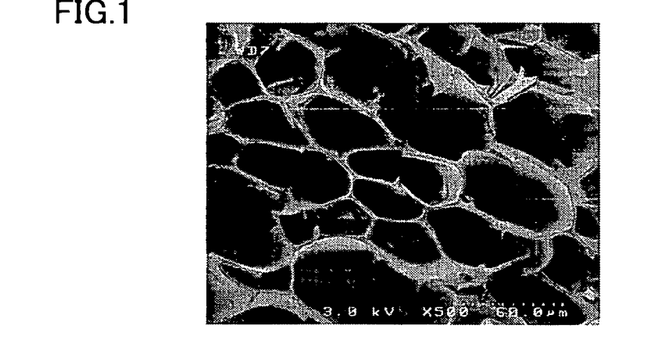
FIG. 1 is an SEM photograph of a cross-section of a honeycomb structure.

The shape of the honeycomb structure is, as is well known, "honeycomb", and it has honeycomb pores formed in a pillar such as a circular pillar. The pillar has pore openings on its upper surface and bottom surface. The pore diameter refers to the diameter of the pore opening. The shape of the upper and bottom surfaces of the pillar may be angular, elliptical or other shape. FIG. 1 is an SEM photograph of the cross-section of the honeycomb structure, when the honeycomb structure is cut parallel to the upper and bottom surfaces. In this figure, the pore size is substantially uniform. Further, it is preferred that the honeycomb structure is porous, and at the surface of the pore, numerous micro/meso pores having the diameter of 1 to 50 nm are formed, and micro/meso pores of adjacent pores may be connected. Though the length of the honeycomb structure is not limited, preferable length is 5 to 30 cm.

<<Pore Diameter and Specific Surface Area>>

Though the average pore diameter of the honeycomb structure is not specifically limited, preferable range is 5 to 200 µm, and more preferable range is 50 to 200 µm. The range of the average pore diameter is determined considering the relation between the pressure loss and the specific surface area when the honeycomb structure is used as a filter or the like.

There is a general tendency that as the average pore diameter of the honeycomb structure becomes smaller, specific surface area become larger and the wall thickness of the honeycomb structure becomes thinner. The surface area to volume ratio is $1\times10^3$ to $5\times10^5$ $m^2/m^3$. When the honeycomb structure of the present invention is formed of a porous material, however, the specific surface area does not much vary even when the average pore diameter changes. Thus, the surface area to volume ratio is $7\times10^7$ to $1\times10^8$ $m^2/m^3$. The honeycomb structure of the present invention is preferably implemented such that the specific surface area is in the range of 100 to 1500 $m^2/g$, and particularly in the range of 700 to 1000 $m^2/g$ ($7\times10^7$ to $1\times10^8$ $m^2/m^3$). Conditions for manufacturing the honeycomb structure having the average pore diameter and the specific surface area of such preferable ranges will be described later.

In order to improve adsorption capacity of the honeycomb structure, it is necessary to increase surface area. In other words, it is preferred that the number of micro pores having the diameter of 2 nm or smaller is increased. On the other hand, the rate of molecular diffusion is very slow in the micro pores, and hence, in order to attain higher efficiency, presence of meso pores having the diameter of 2 to 50 nm is also important.

The average pore diameter may be known by direct observation of the cross-section of the honeycomb structure by scanning electron microscope (SEM), taking a photograph and analyzing the photograph.

The specific surface area may be known by nitrogen adsorption/desorption measurement at $-196°$ C. and by analyzing the resulting adsorption/desorption isotherm using BET plot.

<Composite Honeycomb Structure>

The composite honeycomb structure refers to the honeycomb structure described above, particularly the porous honeycomb structure, having metal fine particles carried on the surface, the honeycomb structure having the metal fine particles contained (dispersed) therein, or a combination thereof. Here, it is preferred that the metal fine particles having particle diameter of 1 to 50 nm are used.

In the honeycomb structure having the metal fine particles carried thereon, metal fine particles of about 0.016 to 0.16 $mg/m^2$ are adhered on its surface.

In the honeycomb structure having metal fine particles contained therein, metal fine particles are dispersed in the honeycomb structure at the ratio of 0.2 to 3.5 g/L.

Though the metal fine particles are not specifically limited, use of noble metal is preferred, and platinum and silver are particularly preferred. By the use of such metal fine particles, it is possible to remove substance that contaminates living environment and is harmful (toxic) to human body. Specific examples of the harmful substance include carbon monoxide, toluene, xylene and formaldehyde.

<Translucent Honeycomb Structure>

Figure 4:
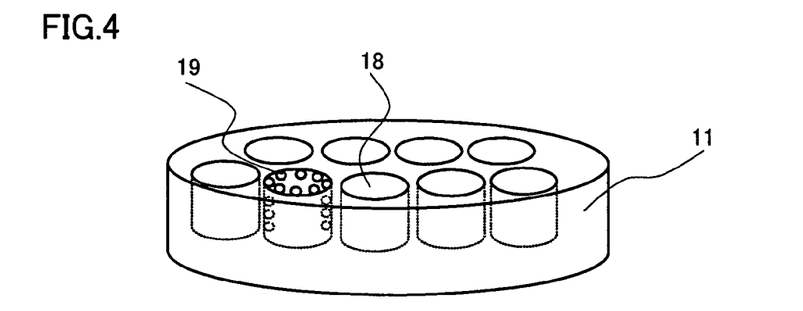
FIG. 4 is a perspective view schematically showing a photocatalyst-carrying translucent honeycomb structure.

The shape of the translucent honeycomb structure is, as is well known, "honeycomb", and it has honeycomb pores 18 formed in a circular pillar, as shown in the perspective view of FIG. 4. The circular pillar has pore openings on its upper surface and bottom surface. Though the translucent honeycomb structure of FIG. 4 has a circular pillar shape, the shape of the upper and bottom surfaces of the pillar may be angular, elliptical or any other shape. It is preferred that the translucent honeycomb structure is porous, and at the surface of the pore 18, numerous micro/meso pores having the diameter of 1 to 50 nm are formed, and micro/meso pores of adjacent pores may be connected. Though the length of the translucent honeycomb structure is not limited, preferable length is 0.05 to 30 cm. When the translucent honeycomb structure 11 has circular pillar shape, it is preferred that the diameter of the pillar is 1 to 30 cm.

Here, translucency index of the translucent honeycomb structure will be described with specific measurements. By way of example, a honeycomb structure of a circular pillar shape having the diameter of 5 to 10 mm and average pore diameter of 5 to 50 µm (the honeycomb structure described in Japanese Patent Laying-Open No. 2004-307394, which is white) may be compared with a translucent honeycomb structure of a circular pillar shape also having the diameter of 10 mm and average pore diameter of 50 µm for consideration. Light beam of ultraviolet to visible range is directed to the upper and bottom surfaces of the former honeycomb structure and the latter, translucent honeycomb structure for measuring absorbance. The absorbance of the former honeycomb structure was 0.5 to 1 or higher, while that of the latter, translucent honeycomb structure was at most 0.4.

<<Pore Diameter and Specific Surface Area>>

Though the average pore diameter of translucent honeycomb structure 11 shown in FIG. 4 is not specifically limited, preferable range is 5 to 200 µm, and more preferable range is 50 to 200 µm. The range of the pore diameter is determined considering the relation between the pressure loss and the specific surface area when translucent honeycomb structure 11 is used as a filter or the like.

There is a general tendency that as the average pore diameter of the honeycomb structure becomes smaller, specific surface area become larger and the wall thickness of the honeycomb structure becomes thinner. The surface area to volume ratio is $1 \times 10^3$ to $5 \times 10^5$ $m^2/m^3$. When the translucent honeycomb structure of the present invention is formed of a porous material, however, the specific surface area does not much vary even when the average pore diameter changes. Thus, the surface area to volume ratio is $7 \times 10^7$ to $1 \times 10^8$ $m^2/m^3$. It is preferred that the translucent honeycomb structure of the present invention is implemented to have the average pore diameter in the range of 5 to 200 μm and to have the specific surface area in the range of 100 to 1500 $m^2/g$, and particularly in the range of 700 to 1000 $m^2/g$ ($7 \times 10^7$ to $1 \times 10^8$ $m^2/m^3$). Further, when the average pore diameter is about 5 to about 200 μm, translucency of the translucent honeycomb structure becomes high. Conditions for manufacturing the translucent honeycomb structure having the average pore diameter and the specific surface area of such preferable ranges will be described later.

In order to improve adsorption capacity of the translucent honeycomb structure, it is necessary to increase surface area. In other words, it is preferred that the number of micro pores having the diameter of 2 nm or smaller is increased. On the other hand, the rate of molecular diffusion is very slow in the micro pores, and hence, in order to attain higher efficiency, presence of meso pores having the diameter of 2 to 50 nm is also important.

The average pore diameter may be known by direct observation of the cross-section of the translucent honeycomb structure by scanning electron microscope (SEM), taking a photograph and analyzing the photograph.

The specific surface area may be known by nitrogen adsorption/desorption measurement at −196° C. and by analyzing the resulting adsorption/desorption isotherm using BET plot.

<Photocatalyst-Carrying Translucent Honeycomb Structure>

FIG. 4 is a perspective view of a photocatalyst-carrying translucent honeycomb structure. In the following, description will be given with reference to the figure. When photocatalyst fine particles 19 are introduce to be carried on the surface of and/or to be contained in the translucent honeycomb structure described above, a photocatalyst-carrying translucent honeycomb structure 11 having the photocatalytic function of decomposing harmful substance can be formed. Here, photocatalyst refers to a substance that comes to have oxidizing power to decompose harmful substance when irradiated with light. It has deodorizing function, antibacterial function, and the function of cleaning air or purifying water. As photocatalyst fine particles 19, metal oxide such as ZnO or $SrTiO_3$ may be used other than titanium oxide. Photocatalyst fine particles 19 having the diameter of 1 to 5 nm are preferred.

In the photocatalyst-carrying translucent honeycomb structure having the photocatalyst fine particles carried on the translucent honeycomb structure, the photocatalyst fine particles of about $10^7$ to $10^{10}/cm^2$ are adhered on the surface.

In the photocatalyst-carrying translucent honeycomb structure in which the translucent honeycomb structure contains the photocatalyst fine particles, it can be confirmed by an observation of a cross-section using an electron microscope that photocatalyst fine particles are dispersed in the translucent honeycomb structure at the ratio of $10^5$ to $10^7/cm^2$.

Photocatalyst-carrying translucent honeycomb structure 11 has high effect to remove harmful substance when light beam is directed parallel to the pores. In the present invention, the harmful substance refers generally to substances harmful to human body considering safety, and specific examples include carbon monoxide, malodorant substance such as sulfur compound, $SO_x$, $NO_x$, toluene, xylene, benzene and formaldehyde.

<Method of Manufacturing Honeycomb Structure>

Though the method of manufacturing the honeycomb structure of the present invention is not specifically limited, it is preferred that the structure is formed by utilizing unidirectional freeze gelation. It is more preferred that the structure is formed by the manufacturing method of the present invention, which will be described later. Here, the unidirectional freeze gelation is a technique realized by a combination of freeze gelation and unidirectional freezing. Here, the freeze gelation refers to a method of gelation utilizing the freeze concentration effect. When sol is frozen, phase separation occurs, resulting in two phases, that is, a phase in which almost pure water is frozen, and a phase in which colloid particles are concentrated. The effect of promoting gelation by concentration is so high, that even at a low temperature, colloid particles collected in the gap in the ice are bonded and turned to gel. Here, the ice serves as a template, and after thawing and drying, the sample having the shape as frozen can be obtained. On the other hand, unidirectional freezing is a method of controlling growth of ice. In this method, gel of metal oxide is frozen with directivity, so that ice is grown as pillars in one direction to provide a plurality of ice pillars, and particles are collected in the spaces among the pillars. The conventional unidirectional freezing has been known as a method of fabricating polygonal fiber of metal oxide gel, and has been mainly applied to hard, wet gel of a structure obtained by aging for a long time. In the present invention, the freeze gelation method and the unidirectional freezing method are combined and the application of the conventional unidirectional freezing method is widened to sol and wet gel immediately after gelation, to manufacture the honeycomb structure.

The method of manufacturing the honeycomb structure of the present invention using the unidirectional freeze gelation mentioned above will be more specifically described in the following. The manufacturing method is characterized in that it includes the following steps (a) to (f) of:

(a) preparing silica sol by mixing ion exchange resin in sodium silicate aqueous solution;

(b) removing the ion exchange resin and adjusting pH;

(c) gelating the silica sol to provide silica wet gel;

(d) freezing the silica wet gel;

(e) thawing the frozen silica wet gel; and (f) after thawing, drying to provide silica gel.

According to the manufacturing method of the present invention, first, using sodium silicate solution (water glass) as a raw material, sodium silicate aqueous solution is prepared by diluting with pure water. When the concentration of the sodium silicate aqueous solution is too low, solute for forming the honeycomb wall is insufficient, and when the concentration is too high, gelation starts during ion exchange. Therefore, the concentration should preferably be adjusted to the range of 1.0 to 2.0 M. To the sodium silicate aqueous solution prepared in this manner, ion exchange resin is added and mixed, as preprocessing (step (a)). At step (a), it is possible to adjust pH of silica sol using the water glass as a raw material, and to sufficiently remove Na ions as impurity that alters characteristics when adsorbed to the surface of silica particles. Step (a) is particularly performed to manufacture a honeycomb structure having regular average pore diameter. Specifically, to the sodium silicate aqueous solution contained, for example, in a vessel with a pH meter (and an ion meter, as needed), highly acidic ion exchange resin is added until desired pH value (for example, pH 2 to 3) is reached.

Though the ion exchange resin used at step (a) is not specifically limited, use of highly acidic ion exchange resin is preferred, because Na ions in the silica sol can sufficiently be removed while pH is adjusted. An example of such ion exchange resin is Amberlite IR120B H AG of Organo Corporation.

The amount of ion exchange resin to be mixed with the sodium silicate aqueous solution is not specifically limited, either. It is preferred, however, that the volume is one half to approximately the same as the volume of the sodium silicate aqueous solution. The amount of ion exchange resin depends on the concentration of sodium silicate aqueous solution to be prepared, and when the amount of ion exchange resin is small, removal of Na ions would possibly be insufficient and when the amount of ion exchange resin is large, pH tends to be too small and gelation takes long time.

At the next step (b), the ion exchange resin mixed at step (a) is removed. The ion exchange resin may be removed by using, for example, a suitable sieve. When specific surface area is to be controlled here, aqueous solution of ammonia is added after removal of ion exchange, for pH adjustment.

At the next step (c), silica sol is gelated to obtain silica wet gel. Gelation of silica sol may be performed, for instance, by filling the composite slurry obtained in the step described above in a tubular vessel (cell) to be used at steps (d) and (e) later, and leaving it stationary for about 2 to 8 hours at a temperature range of 20 to 40° C. Thus, silica wet gel is obtained. It is naturally possible to perform gelation of silica sol in a different vessel and to put the resulting silica wet gel in the tubular vessel to be used in step (d).

Next, at step (d), silica wet gel obtained at step (c) is frozen. Freezing of the silica wet gel is performed by inserting the gel in the tubular cell mentioned above to a coolant such as liquid nitrogen at a prescribed rate of insertion using, for example, a constant speed motor. As the silica wet gel is inserted to the coolant, the ice at the portion put in the coolant grows as a pillar along the direction of insertion.

In order to obtain the honeycomb structure of the present invention after freezing, the time of aging to the start of freezing of the silica wet gel (hereinafter also referred to as first aging) is controlled. The time of aging is preferably in the range of 0.5 to 12 hours. As the aging time becomes longer, the shape after freezing changes from thin film, flat fiber, honeycomb to polygonal fiber (see Japanese Patent Laying-Open No. 2004-307294 described above). Such a change in shape is considered to come from mobility of silica particles at the time of freezing. As the time of aging becomes longer, gelation proceeds and motion of silica particles is inhibited. When the aging time is short, silica particles are relatively movable, and hence, the particles collect to form continuous thin film or flat fiber. About the time of gelation, silica particles hardly move, and therefore, the particles existing around the ice pillars are frozen as they are, forming the honeycomb shape. When gelation further proceeds, the particles are separated by the growth of ice pillars, resulting in fiber shape. Therefore, by adjusting the time of first aging, it is possible to form the silica gel of honeycomb shape.

Further, by changing the conditions of freezing, the diameter of ice pillars serving as the template can be changed, and therefore, it is possible to form the honeycomb structure having the desired average pore diameter. As preferable freezing conditions, the tubular cell mentioned above is inserted to a coolant of $-196°$ C. to $-10°$ C. at an insertion rate of 0.5 to 70 cm/h, and as more preferable conditions, the tubular cell mentioned above is inserted to a coolant of $-196°$ C. to $-20°$ C. at an insertion rate of 1 to 20 cm/h. As described above, unidirectional freeze gelation is a sort of wet synthesis method, and therefore, it can be used in combination with the superior nano structure control technique of sol-gel method. Therefore, when the porous material is fabricated using this method, the nano pore characteristics such as average fine pore diameter, specific surface area, and pore volume of the eventually obtained honeycomb structure can precisely be controlled by adjusting raw material composition and aging conditions.

In the manufacturing method of the present invention, it is preferred to perform, after freezing at step (d) above, aging for a prescribed time period (hereinafter also referred to as second aging) in the frozen state. By performing the second aging, it becomes possible to reinforce the silica wet gel structure while the ice is serving as the template. As to the method of second aging, preferably, the tubular cell mentioned above is left stationary at a relatively low temperature of $-196°$ C. to $-20°$ C. for 1 to 3 hours.

Next, at step (e), the frozen, honeycomb-shaped silica wet gel is thawed. Thawing is done by putting the tubular cell after second aging into a constant-temperature bath of, for example, 50° C. When aqueous solution of ammonia has not been added at step (b) described above, an aging (hereinafter also referred to as third aging) in which the formed silica wet gel is immersed in an aqueous solution of ammonia for a prescribed time period may be performed after thawing, to control pore characteristics. It is preferred that the third aging is performed at a temperature of 30 to 80° C. for 1 to 3 hours. Here, a step of cutting the frozen honeycomb-shaped silica wet gel or thawed honeycomb-shaped silica wet gel to 0.1 to 5 cm may be included. The specific surface area of the finally obtained honeycomb structure may be controlled by adjusting time of immersion or temperature of aqueous solution of ammonia used in the third aging.

Next, drying of the honeycomb-shaped silica wet gel at step (f) will be described. In the present invention, it is possible to dry the honeycomb-shaped silica wet gel by a plurality of methods. By drying, the silica wet gel turns to silica gel.

Next, specific methods of drying the thus obtained honeycomb-shape silica wet gel will be described. In the present invention, it is possible to dry the honeycomb-shaped silica wet gel by a plurality of methods.

First, freeze drying will be described. The thawed honeycomb-shaped silica wet gel is immersed in t-butanol of at least 5 times larger in volume. Thereafter, cleaning with t-butanol is performed for 2 to 4 days, so that small amount of water contained in the thawed honeycomb-shaped silica wet gel is replaced by t-butanol, and then the honeycomb-shaped silica wet gel is freeze-dried at $-30$ to $-10°$ C. Density change at liquid-solid phase transition of t-butanol is as small as $\Delta\rho=-3.4\times10^{-4}$ g/cm$^3$ at 299K, and therefore, possibility of damaging the honeycomb-shaped silica wet gel at the time of solidification is small. Further, t-butanol has high vapor pressure, as can be seen from the fact that vapor pressure of water at 0° C. is $p_0=61$ Pa while vapor pressure of t-butanol at 0° C. is $p_0=821$ Pa, and hence, drying rate is high.

Next, microwave drying will be described. Microwave drying is effected by dipole rotation of molecules and ion current existing in the medium caused by the electromagnetic wave. By this method of drying, water is heated very efficiently, and therefore, this method may be used for drying the small amount of water contained in the thawed honeycomb-shaped silica wet gel. It is necessary, however, to adjust microwave output and to consider intermittent radiation so that the temperature is kept lower than an internal temperature at which the honeycomb-shaped silica wet gel may be damaged during drying.

Next, drying by superheated steam will be described. The superheated steam refers to steam of 100° C. or higher obtained by heating saturated vapor without applying any pressure. It is possible to dry the thawed honeycomb-shaped silica wet gel by putting the same in the superheated steam atmosphere of 170 to 300° C. Here, surface tension generated at the time of evaporation of water may possibly cause cracks in the honeycomb-shaped silica wet gel. Therefore, in order to minimize collapse of the honeycomb-shaped silica wet gel caused by cracks and the like, it is preferred to dry the honeycomb-shaped silica wet gel adapted to have the length (thickness) of about 1 to 20 mm.

By considering conditions of the method of manufacturing the honeycomb structure described above, a porous honeycomb structure can be fabricated.

<Method of Manufacturing Composite Honeycomb Structure>

By incorporating the step of having metal fine particles carried/dispersed into the method of manufacturing the honeycomb structure described above, a composite honeycomb structure can be obtained. Though the metal fine particles are not specifically limited, use of noble metal is preferred, and platinum and silver are particularly preferred.

As to the method of introducing metal fine particles to be carried on the honeycomb structure commonly used as a filter, generally, the surface of the honeycomb structure is coated with ceramic component of high surface area exceeding 100 $m^2/g$ referred to as washcoat, and the metal fine particles are carried on its surface. In the present invention, the honeycomb structure is formed of silica gel, and therefore, the honeycomb structure as a whole is preferably porous. Therefore, it is possible to carry the metal fine particles directly, without the necessity of coating the surface of the honeycomb structure with ceramic component, and the composite honeycomb structure can be fabricated.

The step (g) of introducing metal fine particles to be carried is preferably inserted immediately before or immediately after the step of drying the honeycomb structure (step (f)) described above. Here, the method of introducing may include immersion in an aqueous solution having 0.3 to 3 wt % of metal fine particles stirred therein, and spraying of the solution containing 0.3 to 3 wt % of metal fine particles.

Preferably, metal fine particles having the particle size of 1 to 50 nm are used, and in the present invention, preferably, the metal fine particles are carried at the ratio of 0.016 to 0.16 $mg/m^2$.

When the honeycomb structure is of a water-absorbing material such as ceramics represented by silica gel, it is also possible to drop aqueous solution having 0.3 to 3 wt % of metal fine particles stirred therein from above the honeycomb structure. No matter which method is used, after introduction of particles to be carried, the structure is dried at 150 to 250° C. for 120 to 240 minutes. Thus, aqueous solution components including water and solvent are removed.

Further, it is possible to disperse metal fine particles in the honeycomb structure at step (h). In that case, in the method of manufacturing the honeycomb structure, after ion exchange resin is removed and pH is adjusted to prepare the silica sol (step (b)) described above, a step (h) of dispersing metal fine particles at the ratio of 0.2 to 3.5 g/L is inserted.

<Method of Manufacturing Translucent Honeycomb Structure>

Figure 5:
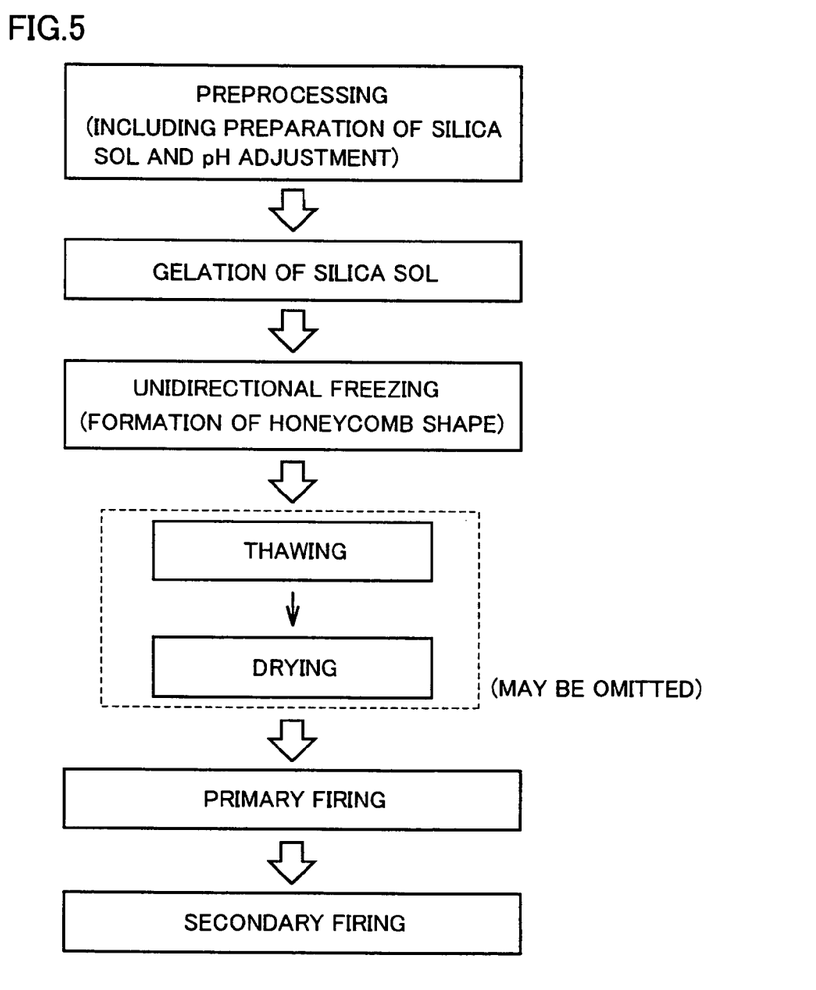
FIG. 5 is a flowchart representing fabrication of the translucent honeycomb structure.

The method of manufacturing the translucent honeycomb structure in accordance with the present invention will be described specifically in the following, with reference to the flowchart of FIG. 5 for fabricating the translucent honeycomb structure. The manufacturing method of the present invention is characterized in that it includes the following steps of (a) preparing silica sol by mixing ion exchange resin in sodium silicate aqueous solution;

(b) removing the ion exchange resin and adjusting pH;

(c) gelating the silica sol to provide silica wet gel;

(d) freezing the silica wet gel;

(e) thawing the frozen silica wet gel;

(f) after thawing, drying to provide silica gel;

(i) performing primary firing of the honeycomb structure formed by silica gel or silica wet gel at 200 to 1000° C.; and (j) after the primary firing, quenching and thereafter performing secondary firing at 1200 to 2000° C.

Here, steps (a) to (f) in the method of manufacturing the translucent honeycomb structure may be performed in the similar manner as steps (a) to (f) in the method of manufacturing the honeycomb structure described above.

At step (f), it is preferred to dry by freeze drying, as cracks of honeycomb-shaped silica wet gel and collapse of fine pores are not likely during drying. For freeze-drying, preferable temperature range is −10° C. to −30° C., because when the temperature is high, the solvent would not be fully frozen and when the temperature is too low, the rate of drying becomes slow. Alternatively, the honeycomb-shaped silica wet gel may be dried by microwave drying or drying by superheated steam described above.

Steps (e) and (f) may be omitted and the process flow may proceed to steps (i) and (j).

To obtain the translucent honeycomb structure, the honeycomb structure fabricated through the method above is put in an electric furnace, and kept at 200 to 1000° C. for 1 to 3 hours with the furnace set to any of noble gas atmosphere, reducing atmosphere, oxidizing atmosphere, vacuum and superheated steam atmosphere, as the primary firing (step (i)). Here, nitrogen atmosphere is particularly preferred. Thereafter, the honeycomb structure is quenched to about 50 to about 150° C., and thereafter, kept at 1200 to 2000° C. for 1 to 120 minutes with the furnace again set to any of noble gas atmosphere, reducing atmosphere, oxidizing atmosphere, vacuum and superheated steam atmosphere, as the secondary firing (step (j)). Thereafter, the honeycomb structure is cooled to the room temperature to 50° C., and thus, the translucent honeycomb structure is obtained.

<Method of Manufacturing Photocatalyst-Carrying Translucent Honeycomb Structure>

By inserting the step of introducing photocatalyst to be carried/contained to the method of manufacturing the translucent honeycomb structure described above, the photocatalyst-carrying translucent honeycomb structure can be obtained.

Photocatalyst fine particles 19 are introduced to be carried after thawing the frozen honeycomb-shaped silica wet gel, or before the primary firing described above, or after the formation of translucent honeycomb structure. Here, the method of introducing may include immersion in an aqueous solution having 1 to 5 g/L of photocatalyst fine particles 19 stirred therein, and spraying of the solution containing 1 to 5 g/L of photocatalyst fine particles.

When photocatalyst fine particles 19 are introduced to be carried after thawing the frozen honeycomb-shaped silica wet gel or before the primary firing as described above, following manufacturing steps are similar to those of the method of manufacturing the translucent honeycomb structure described above.

Preferably, photocatalyst fine particles 19 have the particle diameter of 0.1 to 50 nm, and in the present invention, preferably, the photocatalyst fine particles are carried at the ratio of about $10^8/cm^2$, assuming that the particle diameter is 2 nm.

When the translucent honeycomb structure is of a water-absorbing material such as ceramics represented by silica gel, it is also possible to drop aqueous solution having photocatalyst fine particles 19 stirred therein from above the translucent honeycomb structure. No matter which method is used, after introduction of particles to be carried, the structure is dried at 110 to 200° C. for 1 to 60 minutes. Thus, aqueous solution components including water and solvent are removed.

When photocatalyst fine particles 19 are to be contained in the translucent honeycomb structure, photocatalyst fine particles 19 is dispersed at the ratio of 1 to 5 g/L into the silica sol solution with the above-described ion exchange resin removed.

<Air Cleaner>

Figure 2:
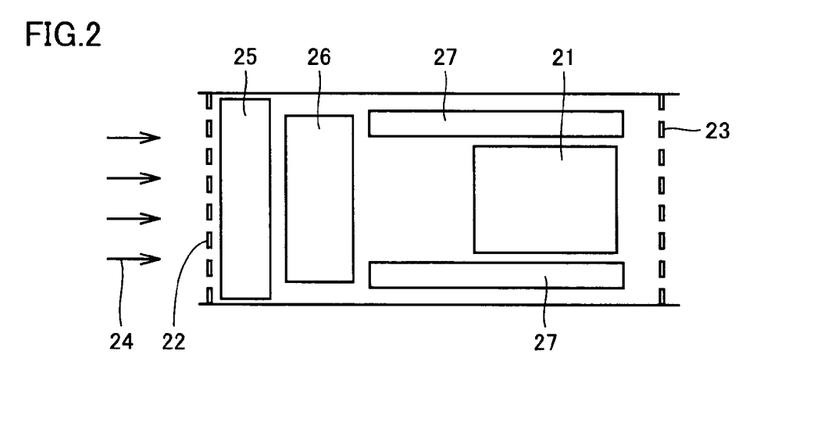
FIG. 2 is a cross-sectional view schematically showing an air cleaner using the composite honeycomb structure as a filter.

FIG. 2 shows an example of an air cleaner having the composite honeycomb structure obtained in accordance with the present invention used as a filter. As shown in FIG. 2, it includes an air inlet 22, a dust collector filter 25, blower means 26, a heater 27, a composite honeycomb structure 21 and an air outlet 23. The air flows along the direction of a flow path 24. By blower means 26, the air of a room containing harmful substance is circulated through air inlet 22, dust collector filter 25, blower means 26, heater 27, composite honeycomb structure 21 and air outlet 23. As the air of the room is circulated, 60 to 80% of harmful substance in the air is removed as the air of the room passes through composite honeycomb structure 21, and the air with the harmful substance removed is discharged through air outlet 23.

Blower means 26 may be a propeller-shaped blower (fan), or means for compressing and feeding air such as a pressure nozzle. Heater 27 is unnecessary for a gas that is removed at a room temperature.

Figure 6:
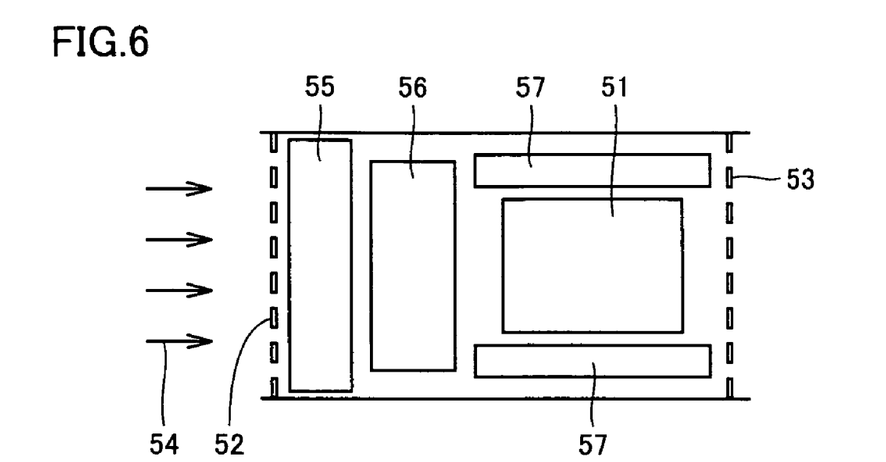
FIG. 6 is a cross-sectional view schematically showing an air cleaner using the photocatalyst-carrying translucent honeycomb structure.

FIG. 6 is a schematic cross-sectional view of an air cleaner using the photocatalyst-carrying translucent honeycomb structure described above. The air cleaner in accordance with the present invention preferably includes, as shown in FIG. 6, an air inlet 52, a photocatalyst-carrying translucent honeycomb structure 51, a light source 57 and an air outlet 53. Further, it may include a dust collector filter 55 and blower means 56. The air flows along the direction of a flow path 54. When photocatalyst-carrying translucent honeycomb structure 51 is irradiated with light from light source 57 and the air is caused to flow in the direction of flow path 54, 50 to 100% of harmful substance can be removed.

Blower means 56 may be a propeller-shaped blower (fan), or means for compressing and feeding air such as a pressure nozzle.

<Water Purifier>

Figure 3:
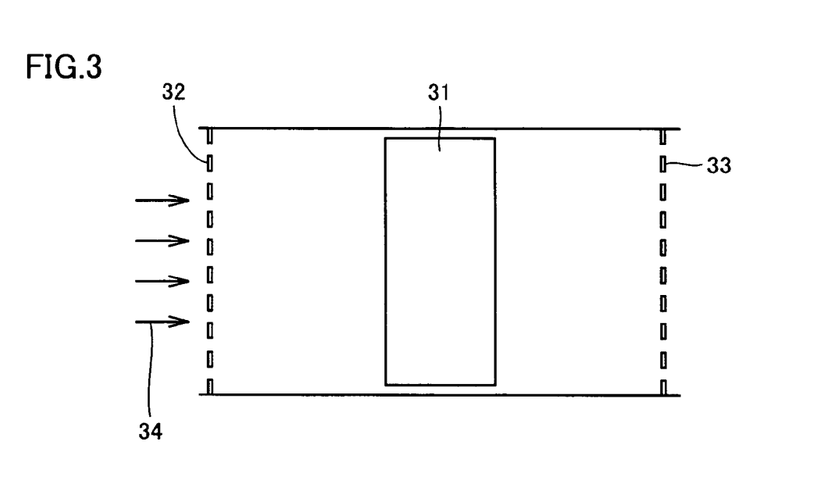
FIG. 3 is a cross-sectional view schematically showing a water purifier using the composite honeycomb structure as a water purifying filter.

FIG. 3 shows an example of a water purifier using the composite honeycomb structure obtained in accordance with the present invention. Water purification is done, for example, by utilizing the antibacterial function of metal ions, such as silver ions, and therefore, use of a composite honeycomb structure carrying silver is preferred. As shown in FIG. 3, the purifier includes a fluid inlet 32, a flow path 34, a composite honeycomb structure 31 and a fluid outlet 33. Water flows through water inlet 32, composite honeycomb structure 31 carrying metal fine particles, and fluid outlet 33. As the water is introduced through fluid inlet 32 and passed through composite honeycomb structure 31, metal ions are dissolved in the water, and metal ion water is provided from fluid outlet 33.

Figure 7:
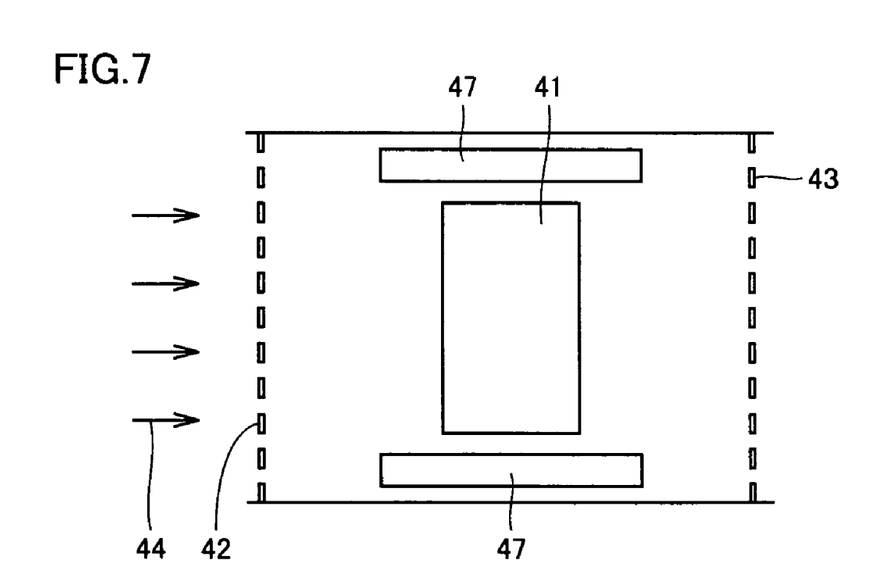
FIG. 7 is a cross-sectional view schematically showing a water purifier using the photocatalyst-carrying translucent honeycomb structure as a water purifying filter.

FIG. 7 is a schematic cross-sectional view of a water purifier applying the photocatalyst-carrying translucent honeycomb structure to water purification. The water purifier in accordance with the present invention preferably includes, as shown in FIG. 7, a fluid inlet 42, a photocatalyst-carrying translucent honeycomb structure 41, a light source 47 and a fluid outlet 43. The fluid flows along the direction of flow path 44.

When photocatalyst-carrying translucent honeycomb structure 41 is provided between fluid inlet 42 and fluid outlet 43 and water represented by daily life water is to be purified, first, by the filtering effect attained by the channel pores of the translucent honeycomb structure, harmful substance can be filtered out by the channel pores and removed. By directing specific light beam, for example, ultraviolet ray from light source 47 to the filtered harmful substance, the substance may be detoxified.

EXAMPLES

Examples 1 to 5 are examples of composite honeycomb structures having silver carried by the honeycomb structures, and Examples 6 to 10 are examples of composite honeycomb structures having silver contained in the honeycomb structures.

Examples 11 to 15 are examples of composite honeycomb structures having platinum carried by the honeycomb structures, and Examples 16 to 20 are examples of composite honeycomb structures having platinum contained in the honeycomb structures. Further, Examples 21 to 25 are examples of translucent honeycomb structures and photocatalyst-carrying translucent honeycomb structures.

Example 1

Sodium silicate solution (manufactured by Wako Pure Chemical Industries, Ltd.) was diluted with deionized distilled water, and 25 mL of sodium silicate aqueous solution having $SiO_2$ concentration of 1.9 mol/L was obtained. To the sodium silicate aqueous solution, 29 mL of $H^+$ type highly acidic ion exchange resin (Amberlite IR120B H AG of Organo Corporation) was added and stirred so that pH of the sodium silicate aqueous solution was adjusted around 2.8, and silica sol was obtained. Here, a tube formed of polypropylene having an inner diameter of 1.3 cm was prepared, and glass beads was filled to about 1 cm at the bottom of the tube. The ion exchange resin was removed from the silica sol, and the silica sol was poured to 5 cm into the tube, the tube was closed with a lid, and left stationary at 30° C. It took 2 hours until the silica sol became uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube, and immersed in t-butanol. Thereafter, cleaning with t-butanol was performed at least three times over three days, and the water contained in the silica wet gel was fully replaced by t-butanol. The silica wet gel with the water fully replaced by t-butanol was freeze-dried at −10° C., and a honeycomb structure was obtained. The honeycomb structure was cut to the length of 5 mm, immersed in a 0.3 wt % silver colloid paste aqueous solution and dried, whereby a composite honeycomb structure carrying silver was obtained.

Example 2

Operations similar to those of Example 1 were conducted until the silica sol turned to uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube, and immersed in t-butanol. Thereafter, cleaning with t-butanol was performed at least three times over three days, and the water contained in the silica wet gel was fully replaced by t-butanol. The silica wet gel with the water fully replaced by t-butanol was dried by microwave for 10 minutes, and a honeycomb structure was obtained. The honeycomb structure was cut to the length of 5 mm, immersed in a 0.3 wt % silver colloid paste aqueous solution and dried, whereby a composite honeycomb structure carrying silver was obtained.

Example 3

Operations similar to those of Example 1 were conducted until the silica sol turned to uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was dried by microwave for 10 minutes, and a honeycomb structure was obtained. The honeycomb structure was cut to the length of 5 mm, immersed in a 0.3 wt % silver colloid paste aqueous solution and dried, whereby a composite honeycomb structure carrying silver was obtained.

Example 4

Operations similar to those of Example 1 were conducted until the silica sol turned to uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube, and cut to about 5 mm. The silica wet gel cut to about 5 mm was dried with superheated steam at emission temperature of 200° C. for 10 minutes, and a honeycomb structure was obtained. The honeycomb structure was immersed in a 0.3 wt % silver colloid paste aqueous solution and dried, whereby a composite honeycomb structure carrying silver was obtained.

Example 5

Operations similar to those of Example 1 were conducted until the silica sol turned to uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube, and cut to about 5 mm. The silica wet gel cut to about 5 mm was immersed in a 0.3 wt % silver colloid paste aqueous solution and dried with superheated steam at emission temperature of 200° C. for 10 minutes, whereby a composite honeycomb structure carrying silver was obtained.

Example 6

Sodium silicate solution (manufactured by Wako Pure Chemical Industries, Ltd.) was diluted with deionized distilled water, and 25 mL of sodium silicate aqueous solution having $SiO_2$ concentration of 1.9 mol/L was obtained. To the sodium silicate aqueous solution, 29 mL of $H^+$ type highly acidic ion exchange resin (Amberlite IR120B H AG of Organo Corporation) was added and stirred so that pH of the aqueous solution was adjusted around 2.8, and silica sol was obtained. The ion exchange resin was removed from the silica sol, and thereafter, 3 wt % silver colloid paste of 1/100 in weight relative to the weight of silica sol was added and stirred, so that the silver colloid paste was dispersed in the silica sol. Here, a tube formed of polypropylene having an inner diameter of 1.3 cm was prepared, and glass beads was filled to about 1 cm at the bottom of the tube. The silica sol having silver colloid paste dispersed therein was poured to 5 cm into the tube, the tube was closed with a lid, and left stationary at 30° C. It took 2 hours until the silica sol became uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube, and immersed in t-butanol. Thereafter, cleaning with t-butanol was performed at least three times over three days, and the water contained in the silica wet gel was fully replaced by t-butanol. The silica wet gel with the water fully replaced by t-butanol was freeze-dried at −10° C., and a honeycomb structure containing silver therein was obtained.

Example 7

Operations similar to those of Example 6 were conducted until the silica sol turned to uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube, and immersed in t-butanol. Thereafter, cleaning with t-butanol was performed at least three times over three days, and the water contained in the silica wet gel was fully replaced by t-butanol. The silica wet gel with the water fully replaced by t-butanol was dried by microwave for 10 minutes, and a composite honeycomb structure containing silver therein was obtained.

Example 8

Operations similar to those of Example 6 were conducted until the silica sol turned to uniform silica wet gel.

Two hours after the formation of gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube. By microwave drying of silica wet gel for 10 minutes, a composite honeycomb structure containing silver therein was obtained.

Example 9

Operations similar to those of Example 6 were conducted until the silica sol turned to uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube, and cut to about 5 mm. The silica wet gel cut to about 5 mm was dried by directing superheated steam at emission temperature of 200° C. for 10 minutes, whereby a composite honeycomb structure containing silver therein was obtained.

Example 10

Operations similar to those of Example 6 were conducted until the silica sol turned to uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube, and cut to about 5 mm. The silica wet gel cut to about 5 mm was heated from the room temperature to 500° C. or 1000° C. and kept for 2 hours, and thereafter, the temperature was lowered to the room temperature, whereby a composite honeycomb structure containing silver therein was obtained.

Example 11

Sodium silicate solution (manufactured by Wako Pure Chemical Industries, Ltd.) was diluted with deionized distilled water, and 25 mL of sodium silicate aqueous solution having $SiO_2$ concentration of 1.9 mol/L was obtained. To the sodium silicate aqueous solution, 29 mL of $H^+$ type highly acidic ion exchange resin (Amberlite IR120B H AG of Organo Corporation) was added and stirred so that pH of the aqueous solution was adjusted around 2.8, and silica sol was obtained. Here, a tube formed of polypropylene having an inner diameter of 1.3 cm was prepared, and glass beads was filled to about 1 cm at the bottom of the tube. The ion exchange resin was removed from the silica sol, and the silica sol was poured to 5 cm into the tube, the tube was closed with a lid, and left stationary at 30° C. It took 2 hours until the silica sol became uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube, and immersed in t-butanol. Thereafter, cleaning with t-butanol was performed at least three times over three days, and the water contained in the silica wet gel was fully replaced by t-butanol. The silica wet gel with the water fully replaced by t-butanol was freeze-dried at −10° C., and a honeycomb structure was obtained. The honeycomb structure was cut to the length of 5 mm, immersed in a 0.3 wt % platinum colloid paste aqueous solution and dried, whereby a composite honeycomb structure carrying platinum was obtained.

Example 12

Operations similar to those of Example 11 were conducted until the silica sol turned to uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube, and immersed in t-butanol. Thereafter, cleaning with t-butanol was performed at least three times over three days, and the water contained in the silica wet gel was fully replaced by t-butanol. The silica wet gel with the water fully replaced by t-butanol was dried by microwave for 10 minutes, and a honeycomb structure was obtained. The honeycomb structure was cut to the length of 5 mm, immersed in a 0.3 wt % platinum colloid paste aqueous solution and dried, whereby a composite honeycomb structure carrying platinum was obtained.

Example 13

Operations similar to those of Example 11 were conducted until the silica sol turned to uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was dried by microwave for 10 minutes, and a honeycomb structure was obtained. The honeycomb structure was cut to the length of 5 mm, immersed in a 0.3 wt % platinum colloid paste aqueous solution and dried, whereby a composite honeycomb structure carrying platinum was obtained.

Example 14

Operations similar to those of Example 11 were conducted until the silica sol turned to uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube, and cut to about 5 mm. The silica wet gel cut to about 5 mm was dried with superheated steam at emission temperature of 200° C. for 10 minutes, and a honeycomb structure was obtained. The honeycomb structure was immersed in a 0.3 wt % platinum colloid paste aqueous solution and dried, whereby a composite honeycomb structure carrying platinum was obtained.

Example 15

Operations similar to those of Example 11 were conducted until the silica sol turned to uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube, and cut to about 5 mm. The silica wet gel cut to about 5 mm was immersed in a 0.3 wt % platinum colloid paste aqueous solution and dried with superheated steam at emission temperature of 200° C. for 10 minutes, whereby a composite honeycomb structure carrying platinum was obtained.

Example 16

Sodium silicate solution (manufactured by Wako Pure Chemical Industries, Ltd.) was diluted with deionized distilled water, and 25 mL of sodium silicate aqueous solution having $SiO_2$ concentration of 1.9 mol/L was obtained. To the sodium silicate aqueous solution, 29 mL of $H^+$ type highly acidic ion exchange resin (Amberlite IR120B H AG of Organo Corporation) was added and stirred so that pH of the aqueous solution was adjusted around 2.8, and silica sol was obtained. The ion exchange resin was removed from the silica sol, and thereafter, 2 wt % platinum colloid paste of 1/100 in weight relative to the weight of silica sol was added and stirred, so that the platinum colloid paste was dispersed in the silica sol. Here, a tube formed of polypropylene having an inner diameter of 1.3 cm was prepared, and glass beads was filled to about 1 cm at the bottom of the tube. The silica sol having platinum colloid paste dispersed therein was poured to 5 cm into the tube, the tube was closed with a lid, and left stationary at 30° C. It took 2 hours until the silica sol became uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube, and immersed in t-butanol. Thereafter, cleaning with t-butanol was performed at least three times over three days, and the water contained in the silica wet gel was fully replaced by t-butanol. The silica wet gel with the water fully replaced by t-butanol was freeze-dried at −10° C., and a honeycomb structure containing platinum therein was obtained.

Example 17

Operations similar to those of Example 16 were conducted until the silica sol turned to uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube, and immersed in t-butanol. Thereafter, cleaning with t-butanol was performed at least three times over three days, and the water contained in the silica wet gel was fully replaced by t-butanol. The silica wet gel with the water fully replaced by t-butanol was dried by microwave for 10 minutes, and a composite honeycomb structure containing platinum therein was obtained.

Example 18

Operations similar to those of Example 16 were conducted until the silica sol turned to uniform silica wet gel.

Two hours after the formation of gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube. By microwave drying of silica wet gel for 10 minutes, a composite honeycomb structure containing platinum therein was obtained.

Example 19

Operations similar to those of Example 16 were conducted until the silica sol turned to uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube, and cut to about 5 mm. The silica wet gel cut to about 5 mm was dried by directing superheated steam at emission temperature of 200° C. for 10 minutes, whereby a composite honeycomb structure containing platinum therein was obtained.

Example 20

Operations similar to those of Example 16 were conducted until the silica sol turned to uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube, and cut to about 5 mm. The silica wet gel cut to about 5 mm was heated from the room temperature to 500° C. and kept for 2 hours, and thereafter, the temperature was lowered to the room temperature, whereby a composite honeycomb structure containing platinum therein was obtained.

It was confirmed by direct observation using a scanning electron microscope (SEM) that in Examples 1 to 20, porous materials having such honeycomb structure as shown in FIG. 1 were obtained and that the materials had average pore diameter of 5 to 200 μm.

Comparative Example 1

Sodium silicate solution of 54% (manufactured by Wako Pure Chemical Industries, Ltd.) was diluted with deionized distilled water, and 25 mL of sodium silicate aqueous solution having $SiO_2$ concentration of 1.9 mol/L was obtained. To the sodium silicate aqueous solution, 29 mL of $H^+$ type highly acidic ion exchange resin (Amberlite IR120B H AG of Organo Corporation) was added and stirred so that pH of the sodium silicate aqueous solution was adjusted around 2.8, and silica sol was obtained. Here, a tube formed of polypropylene having an inner diameter of 1.3 cm was prepared, and glass beads was filled to about 1 cm at the bottom of the tube. The ion exchange resin was removed from the silica sol, and the silica sol was poured to 5 cm into the tube, the tube was closed with a lid, and left stationary at 30° C. It took 2 hours until the silica sol became uniform silica wet gel.

Two hours after the formation of silica wet gel, the tube filled with the silica wet gel was inserted to an ethanol coolant bath of −30° C., using a constant speed motor set to insert the tube at the insertion rate of 2 cm/h. After the silica wet gel was fully frozen, the tube filled with the silica wet gel was put in a constant temperature bath of 50° C. and the silica wet gel was thawed. After thawing, the silica wet gel was taken out from the tube, and immersed in t-butanol. Thereafter, cleaning with t-butanol was performed at least three times over three days, and the water contained in the silica wet gel was fully replaced by t-butanol. The silica wet gel with the water fully replaced by t-butanol was freeze-dried at −10° C., and a honeycomb structure was obtained. The honeycomb structure was cut to the length of 5 mm.

(Evaluation Method 1)

In order to evaluate performance of removing harmful substance, the composite honeycomb structure carrying platinum (Sample A) fabricated in accordance with Example 11 was set in a stainless-steel housing placed in an evaluation chamber. Sample A was heated to 200° C. To the evaluation chamber, air of 60% humidity, containing carbon monoxide as harmful substance, was introduced at a flow rate of 100 cc/min., processed gas was introduced directly from an outlet side of the evaluation chamber to a gas chromatograph, and carbon monoxide concentration of the gas was evaluated by a known method of measurement.

Similar analysis was done on the honeycomb structure (Sample B) fabricated in accordance with Example 16 and on the honeycomb structure (Sample C) fabricated in accordance with Comparative Example 1. The results are as shown in Table 1.

As shown in Table 1, carbon monoxide was hardly detected in Samples A and B, while the ratio of carbon monoxide removal was as low as 3.2% in Sample C. Thus, it was confirmed that Samples A and B having platinum particles adhered thereon as catalyst particles had the effect of removing carbon monoxide higher than Sample C.

TABLE 1

|  | Sample A | Sample B | Sample C |
|---|---|---|---|
| Ratio of carbon monoxide removal | 97% | 99% | 3.2% |

(Evaluation Method 2)

In order to evaluate performance of removing harmful substance, the composite honeycomb structure carrying silver (Sample D) fabricated in accordance with Example 1 and silver-exchange zeolite in powder form (Sample E) were used as water purifying filters, and amount of silver ion elution was studied. Water at an ordinary temperature was used and the flow rate was 1.5 L/min. Experiment was conducted using Samples D and E of the same weight (weight of honeycomb structure was about 0.6 g).

As shown in Table 2, when Samples D and E are compared, they have comparative performance as to the amount of stable elution of silver ions, while Sample D had significantly longer duration. Thus, it was confirmed that the composite honeycomb structure had high functionality as a water purifying filter.

TABLE 2

|  | Sample D | Sample E |
|---|---|---|
| Amount of stable elution of silver ions | 4-7 ppb | 3-8 ppb |
| Duration | 1500 min. | 600 min. |

Example 21

Translucent Honeycomb Structure

By diluting 54% sodium silicate solution with deionized distilled water, 25 mL of sodium silicate aqueous solution having the $SiO_2$ concentration of 1.9 mol/L was obtained. To the sodium silicate aqueous solution, 29 mL of $H^+$ type highly acidic ion exchange resin was added and well stirred by a stirrer and pH of the aqueous solution was adjusted around 2.5 using a pH meter, whereby silica sol was obtained. Thereafter, the ion exchange resin was removed from the silica sol, and the silica sol was poured into a tube formed of polypropylene having an inner diameter of 1.3 cm and filled up to 1 cm from the bottom with glass beads, and the tube was left stationary in a constant temperature bath at 30° C. for 2 hours. Thus, uniform silica wet gel was obtained.

Two more hours after the formation of silica wet gel, the tube filled with the silica wet gel was inserted to an ethanol coolant bath of −30° C., using a constant speed motor set to insert the tube at the insertion rate of 2 cm/h, and white, frozen, honeycomb-shaped silica wet gel was obtained. The frozen honeycomb-shaped silica wet gel was cut to the thickness of 5 mm, and put in an electric furnace. The inside of electric furnace was purged by $N_2$ gas, the temperature was set to 200° C. at a heating rate of 5° C./min., and kept for 60 minutes, as the primary firing. Thereafter, the electric furnace was quenched to 100° C., and then, set to 1700° C. at a heating rate of 10° C./min., and kept for 30 minutes, as the secondary firing. Thereafter, quenching was done, and a translucent honeycomb structure was obtained.

Example 22

Translucent Honeycomb Structure

A frozen, honeycomb-shaped silica wet gel was obtained by the same method as Example 21, and the frozen, honeycomb-shaped silica wet gel was immersed in t-butanol, cleaning with t-butanol was performed at least three times over three days, and the water contained in the silica wet gel was fully replaced by t-butanol. Then, the honeycomb structure obtained by freeze drying at −10° C. was put in an electric furnace. The inside of electric furnace was purged by $N_2$ gas, the temperature was set to 200° C. at a heating rate of 5° C./min., and kept for 60 minutes, as the primary firing. Thereafter, the electric furnace was quenched to 100° C., and then, set to 1700° C. at a heating rate of 10° C./min., and kept for 30 minutes, as the secondary firing. Thus, a translucent honeycomb structure was obtained.

Example 23

Photocatalyst-Carrying Translucent Honeycomb Structure

In order to introduce photocatalyst to be carried on translucent honeycomb structure fabricated in accordance with Example 21, the following operation was performed. An aqueous solution of titanium oxide fine particles (P-25, manufactured by Nihon Aerosil) having average particle diameter of 30 nm adjusted to 300 µg/ml was applied by a spray to the translucent honeycomb structure manufactured in accordance with Example 21. As to the conditions of spraying, pressurized gas generated by a compressor is adjusted by a pressure adjuster, and spraying was done at 0.2 Mpa. After spraying, the state of dispersion of fine particles on the surface of translucent honeycomb structure fabricated in accordance with Example 21 was examined, using a scanning electron microscope (SEM) and a transmission electron microscope (TEM). It was confirmed that the fine particles were uniformly carried at the area density of $5 \times 10^{10}/cm^2$. Through the operations above, a photocatalyst-carrying translucent honeycomb structure was obtained.

Example 24

Translucent Honeycomb Structure

By diluting 54% sodium silicate solution with deionized distilled water, 25 mL of sodium silicate aqueous solution having the $SiO_2$ concentration of 1.9 mol/L was obtained. To the sodium silicate aqueous solution, 29 mL of $H^+$ type highly acidic ion exchange resin was added and well stirred by a stirrer and pH of the aqueous solution was adjusted around 2.5 using a pH meter, whereby silica sol was obtained. Thereafter, the ion exchange resin was removed from the silica sol, and the silica sol was poured into a tube formed of polypropylene having an inner diameter of 5.0 cm and filled up to 1 cm from the bottom with glass beads, and the tube was left stationary in a constant temperature bath at 30° C. for 2 hours. Thus, uniform silica wet gel was obtained. Two more hours after the formation of silica wet gel, the tube filled with the silica wet gel was inserted to an ethanol coolant bath of −30° C., using a constant speed motor set to insert the tube at the insertion rate of 2 cm/h, and white, frozen, honeycomb-shaped silica wet gel was obtained. The frozen honeycomb-shaped silica wet gel was cut to the thickness of 1 cm, and put in an electric furnace. The inside of electric furnace was purged by $N_2$ gas, the temperature was set to 200° C. at a heating rate of 5° C./min., and kept for 60 minutes, as the primary firing. Thereafter, the electric furnace was quenched to 100° C., then, set to 1700° C. at a heating rate of 10° C./min., and kept for 30 minutes, as the secondary firing. Thereafter, quenching was done, and a translucent honeycomb structure was obtained.

Example 25

Photocatalyst-Carrying Translucent Honeycomb Structure

In order to introduce photocatalyst to be carried on translucent honeycomb structure fabricated in accordance with Example 24, the following operation was performed. An aqueous solution of titanium oxide fine particles (P-25, manufactured by Nihon Aerosil) having average particle diameter of 30 nm adjusted to 300 µg/ml was applied by a spray to the translucent honeycomb structure manufactured in accordance with Example 24. As to the conditions of spraying, pressurized gas generated by a compressor is adjusted by a pressure adjuster, and spraying was done at 0.2 Mpa. After spraying, the state of dispersion of fine particles on the surface of translucent honeycomb structure fabricated in accordance with Example 24 was examined, using a scanning electron microscope (SEM) and a transmission electron microscope (TEM). It was confirmed that the fine particles were uniformly carried at the area density of $5 \times 10^{10}/cm^2$. Through the operations above, a photocatalyst-carrying translucent honeycomb structure was obtained.

Comparative Example 2

Honeycomb Structure

By diluting 54% sodium silicate solution with deionized distilled water, 25 mL of sodium silicate aqueous solution having the $SiO_2$ concentration of 1.9 mol/L was obtained. To the sodium silicate aqueous solution, 29 mL of $H^+$ type highly acidic ion exchange resin was added and well stirred by a stirrer and pH of the aqueous solution was adjusted around 2.5, whereby silica sol was obtained. Thereafter, the ion exchange resin was removed, and the silica sol was poured into a tube formed of polypropylene having an inner diameter of 5.0 cm and filled with glass beads up to 1 cm from the bottom, and the tube was left stationary in a constant temperature bath at 30° C. for 2 hours. Thus, uniform silica wet gel was obtained. Two more hours after the formation of silica wet gel, the tube filled with the silica wet gel was inserted to an ethanol coolant bath of −30° C., using a constant speed motor set to insert the tube at the insertion rate of 2 cm/h, and white, frozen, honeycomb-shaped silica wet gel was obtained. The frozen honeycomb-shaped silica wet gel was cut to the thickness of 1 cm.

Thereafter, the frozen, honeycomb-shaped silica wet gel described above was put in a constant temperature bath of 35° C. for rapid thawing, and after thawing, it was held in the constant temperature bath for 1 hour.

Finally, drying was done. The thawed honeycomb-shaped silica wet gel was immersed in t-butanol of at least 5 times larger in volume. Thereafter, cleaning with t-butanol was performed for 3 days, so that small amount of water contained in the thawed honeycomb-shaped silica wet gel was replaced by t-butanol, and the thus obtained sample was freeze-dried at −197° C. Through the steps above, a white, honeycomb structure formed of silica gel was obtained.

Comparative Example 3

Photocatalyst-Carrying Honeycomb Structure

In order to introduce photocatalyst to be carried on the honeycomb structure fabricated in accordance with Comparative Example 2, the following operation was performed. An aqueous solution of titanium oxide fine particles (P-25, manufactured by Nihon Aerosil) having average particle diameter of 30 nm adjusted to 300 µg/ml was applied by a spray to the honeycomb structure manufactured in accordance with Comparative Example 2. As to the conditions of spraying, pressurized gas generated by a compressor is adjusted by a pressure adjuster, and spraying was done at 0.2

Mpa. After spraying, the state of dispersion of fine particles on the surface of honeycomb structure fabricated in accordance with Comparative Example 2 was examined, using a scanning electron microscope (SEM) and a transmission electron microscope (TEM). It was confirmed that the fine particles were uniformly carried at the area density of $5\times10^{10}$/ $cm^2$. Through the operations above, a photocatalyst-carrying honeycomb structure was obtained.

(Evaluation Method 3)

Performance of removing harmful substance was studied, using honeycomb-structures of Examples 24, 25 and Comparative Examples 2 and 3.

First, each of the afore-mentioned honeycomb structures was incorporated, by 10 g, as a filter in a chamber formed of stainless steel. Then, at a position adjacent to the filter, a black light of 4 W was installed as a light source, and each filter was irradiated. Thereafter, dry air containing 100 ppm of toluene as an example of harmful substance was introduced at a flow rate of 30 ml/min., from an inlet of the stainless-steel chamber, and the gas discharged from an outlet of the stainless-chamber was collected for 30 minutes in a collection tube.

Toluene concentration of the collected gas was evaluated by a known measurement method using a combination of solid phase adsorption/thermal desorption and gas chromatography/mass spectrometry. As the collecting tube, a glass tube having the inner diameter of about 3 to 4 mm filled with about 300 mg of activated carbon was used, and in addition, a dehumidifier tube for removing humidity, a mass flow controller for controlling the flow rate in the range of 100 to 1000 ml/min. and a pump for ensuring flow rate of collection were used.

The harmful substance adsorbed in solid-phase by activated carbon or the like was thermally desorbed and quenched, and using gas chromatograph mass spectrometry (GS/MS), the amount of toluene in the solution was analyzed. Based on the ratio of toluene concentration at the inlet and outlet of the stainless-steel chamber, the ratio of toluene removal was calculated, as shown in Table 3.

First, Comparative Examples 2 and 3 are compared. Though Comparative Example 3 carried a photocatalyst, toluene removal ratio was increased only by 16% from Comparative Example 2. When the data of Examples 24 and 25 are compared, it is noted that the toluene removal ratio of Example 25 carrying the photocatalyst was increased by as much as 54.4% from Example 24. This result shows that as the present invention provides a photocatalyst-carrying translucent honeycomb structure, it has high translucency as a carrier of photocatalyst, which means that light irradiation is easier to reach photocatalyst and, consequently, the function of photocatalyst can fully be exhibited.

Further, the toluene removal ratio of Example 25 was 99.9%, which is extremely higher than other examples. Therefore, as is apparent from Table 3, it was confirmed that when a translucent honeycomb structure was adapted to carry a photocatalyst and the catalyst was activated by light, superior performance of removing harmful substance could be realized.

TABLE 3

| | Translucency | Photocatalyst | Toluene removal ratio (%) |
|---|---|---|---|
| Example 24 | Translucent | — | 45.5 |
| Example 25 | Translucent | Carried | 99.9 |
| Comparative Example 2 | — | — | 53.2 |
| Comparative Example 3 | — | Carried | 69.2 |

(Evaluation Method 4)

By the method similar to Evaluation Method 3, from an inlet of stainless-steel chambers incorporating honeycomb structures of Examples 24 and 25 and Comparative Examples 2 and 3, dry air containing 100 ppm of formaldehyde as an example of harmful substance was introduced at a flow rate of 10 ml/min., and the gas discharged from an outlet of the stainless-chambers was collected for 10 minutes in a collection tube.

Formaldehyde in the collected gas was measured by a known method using liquid chromatography, that is, solid phase adsorption through DNPH (2,4-Dinitrophenylhedrazine) derivatization/solvent extraction-high performance liquid chromatograph (HPLC). In this method, the gas is passed through a DNPH silica gel column, aldehydes are fixed, dissolved with acetonitrile solvent and subjected to HPLC analysis. Similar to Table 3, Table 4 shows the ratio of formaldehyde removal of respective samples. As is apparent from Table 4, it was confirmed that when a translucent honeycomb structure was adapted to carry a photocatalyst and the catalyst was activated by light, superior performance of removing harmful substance could be realized.

TABLE 4

| | Translucency | Photocatalyst | Ratio of formaldehyde removal (%) |
|---|---|---|---|
| Example 24 | Translucent | — | 35.5 |
| Example 25 | Translucent | Carried | 99.7 |
| Comparative Example 2 | — | — | 43.2 |
| Comparative Example 3 | — | Carried | 59.5 |

(Evaluation Method 5)

Each of the honeycomb structures of Examples 24 and 25 and Comparative Examples 2 and 3 was incorporated, by 10 g, in a water quality evaluating system, and ratio of removing harmful substance from water having volatile organic compound (hereinafter also referred to as VOC) mixed to a prescribed concentration was confirmed.

In a chamber formed of Teflon (registered trademark), each honeycomb structure was placed as a filter. In the chamber formed of Teflon (registered trademark), a light source was provided.

A water solution of toluene as the VOC having the concentration of 10 ppm was prepared, which was introduced from an inlet of the chamber formed of Teflon (registered trademark) at the rate of 1 ml/min. Then, solution of 10 ml recovered from the outlet of the chamber formed of Teflon (registered trademark) was subjected to headspace GC-MS analysis, to measure the concentration.

In the headspace GC-MS analysis used here, a vial for headspace containing the sample was heated and kept at 150° C., and the VOC component moved to the headspace was directly introduced to the GC column. The results are as shown in Table 5. Tendency of toluene removal was similar to that of Evaluation Methods 3 and 4. It was confirmed that when a translucent honeycomb structure was adapted to carry a photocatalyst and the catalyst was activated by light, superior performance of removing harmful substance could be realized.

TABLE 5

| | Translucency | Photocatalyst | Ratio of toluene removal (%) |
|---|---|---|---|
| Example 24 | Translucent | — | 47.5 |
| Example 25 | Translucent | Carried | 99.9 |
| Comparative Example 2 | — | — | 51.6 |
| Comparative Example 3 | — | Carried | 52.3 |

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A honeycomb structure having average pore diameter of 5 to 200 μm and specific surface area of 700 to 1000 $m^2/g$, wherein said honeycomb structure is made of silica gel.

2. The honeycomb structure according to claim 1, which is porous.

3. A composite honeycomb structure having metal fine particles carried on a surface of the honeycomb structure according to claim 1 and/or having the metal fine particles contained in the honeycomb structure.

4. The composite honeycomb structure according to claim 3, wherein noble metal is used as said metal fine particles.

5. The composite honeycomb structure according to claim 3, whereinplatinum and/or silver is used as said metal fine particles.

6. An air cleaner using the composite honeycomb structure according to claim 3 as a filter.

7. A water purifier using the composite honeycomb structure according to claim 3 as a water purifying filter.

8. A translucent honeycomb structure having average pore diameter of 5 to 200 μm and specific surface area of 700 to 1000 $m^2/g$, wherein said translucent honeycomb structure is made of silica gel.

9. A photocatalyst-carrying translucent honeycomb structure having a photocatalyst carried on a surface of the translucent honeycomb structure according to claim 8 and/or having the photocatalyst contained in the translucent honeycomb structure.

10. An air cleaner using the photocatalyst-carrying translucent composite honeycomb structure according to claim 9 as a filter.

11. A water purifier using the photocatalyst-carrying translucent composite honeycomb structure according to claim 9 as a water purifying filter.

* * * * *